United States Patent Office 3,577,556
Patented May 4, 1971

---

3,577,556
POLYAMINES STABILIZED WITH AMINO-CARBOXYLATE CHELANTS
Juan Longoria III, Lake Jackson, Tex., assignor to The Dow Chemical Company, Midland, Mich.
No Drawing. Filed Jan. 5, 1968, Ser. No. 695,835
Int. Cl. C07c *87/14, 119/00;* C08g *51/60*
U.S. Cl. 260—45.85                                          9 Claims

ABSTRACT OF THE DISCLOSURE

Aminocarboxylate chelants of the formula;

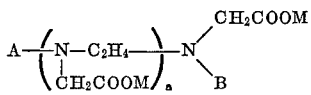

where A and B are independently —$C_2H_4OH$ or

—$CH_2COOM$ $a$ is 0–2, and M is a monovalent cation are effective stabilizers for polyamines including alkylenepolyamines, polyalkylenepolyamines and polyalkylenimines. Addition of about 0.05–10.0 weight percent of the chelant reduces the acid catalyzed and oxidative degradation and discoloration of these polyamines.

BACKGROUND

Polyamines are particularly sensitive to discoloration and degradation in the presence of acids and oxidants including air. When this occurs, the utility of the polyamine in such applications as a paper additive is markedly reduced. Numerous materials have been tested as stabilizers, including ethyl alcohol, suggested by Schroy et al. in U.S. Pat. 2,242.484. Obviously a suitable stabilizing agent should function without any significant change in the chemical and physical properties essential for the intended use of the polyamine.

STATEMENT OF THE INVENTION

It has now been discovered that aminocarboxylate chelants of the formula:

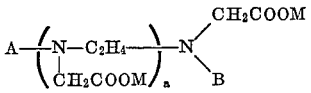

where A and B are independently —$C_2H_4OH$ or

—$CH_2COOM$ $a$ is 0–2, and M is a monovalent cation are superior stabilizers for polyamines. For example, not only does the addition of a chelant such as sodium ethylenediaminetetraacetate reduce the tendency of polyethylenimine to yellow on storage in the presence of oxygen, but it also markedly reduces discoloration and gelation in the presence of strong aqueous acid and trace quantities of heavy metals. Furthermore these chelants are essentially inert to the functioning of the polyamines as paper and textile additives, as chemical intermediates, etc.

Polyamines

Polyamines which may be stabilized according to the present invention include alkylenepolyamines (APA), polyalkylenepolyamines (PAPA) and polyalkylenimines (PAI). Typical alkylenepolyamines include ethylenediamine, propylenediamine and butylenediamine. Suitable polyalkylenepolyamines include diethylenetriamine, triethylenetetramine, tetraethylenepentamine, pentaethylenehexamine, and the analogous propylene polyamines and the butylene polyamines. Polyalkylenepolyamines having molecular weights up to 200,000 and higher may also be stabilized according to the present invention. Such polyalkylenepolyamines are commercially prepared by condensing ammonia or an alkylenepolyamine with a divalent organic compound such as 1,2-dichloroethane, epichlorohydrin, etc.

Yet another class of polyamines which may be stabilized by addition of an aminocarboxylate chelant are the polypropylenimine, and polybutylenimine having molecular weights from less than 1,000 to 1 million and higher. Preparation of a polyalkyleneimine by polymerization of an alkylenimine has been reviewed by Jones. "The Polymerization of Olefin Imines" in P. H. Plesch, ed., The Chemistry of Cationic Polymerization, New York, 1963, pp. 521–534.

The chelant stabilizers are effective with polyamines ranging in molecular weight from about 600–1,000,000 and particularly with polyalkylenepolyamines and polyalkylenimines having a molecular weight of about 5,000–100,000 as well as mixtures thereof.

Such polyamines are frequently used or modified in aqueous solution by such materials as hydrochloric acid and sulfuric acid; halogens, such as fluorine, chlorine, bromine; and iodine; by reaction with a chlorohydrin, including epichlorohydrin, as disclosed in British Pat. No. 1,008,464, and the like. These modifiers all result in acid by-products which cause accelerated discoloration and oxidation of the polyamines. Yet the present invention is particularly useful for stabilizing such acid- or epichlorohydrin-modified polyamines. At the same time, these chelants also inactivate any trace transition metal or heavy metal ions that may be present.

Aminocarboxylate chelants

The aminocarboxylate chelants useful as stabilizers have the formula:

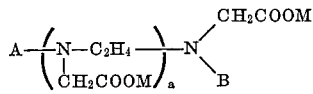

where A and B are independently —$C_2H_4OH$ or

—$CH_2COOM$ groups, $a$ is 0–2, and M is a monovalent cation. Typical of such chelants are the water soluble acids and salts of such amino acids as glycine, N,N-dihydroxyethylglycine, iminodiacetic acid, N-hydroxyethyliminodiacetic acid, nitrilotriacetic acid, ethylenediamine tetraacetic acid, n-hydroxyethylethylenediaminetriacetic acid, diethylenetriaminepentaacetic acid and cyclohexane-1,2-diaminotetraacetic acid, as described, for example, in Chaberek and Martell "Organic Sequestering Agents," John Wiley, New York, 1959. In general the alkali metal salts, particularly sodium, are preferred because of economic and solubility factors.

Addition of as little as 0.05 weight percent of these chelants based on polyamine results in a significant increase in stability and 10 percent or more can generally be added without detrimental effect. But for most polyamines about 0.1–10.0 weight percent is preferred.

In practice the novel stabilized polyamines are prepared simply by adding the aminocarboxylate stabilizer to the polyamine alone or in aqueous or non-aqueous solution and mixing thoroughly. The optimum chelant stabilizer and its proper concentration are readily determined by simple tests.

The following examples illustrate more fully the present invention. Unless otherwise stated all parts and percentages are by weight.

EXAMPLE 1

Stabilization of aqueous polyethylenimine

The gradual discoloration and degradation that occurs during storage of aqueous solutions of polyethylenimine presents many problems, particularly in paper and textile applications where a white color is often desired.

The effectiveness of several aminocarboxylate chelants as stabilizers for aqueous PEI solutions is demonstrated in Table I by data from an accelerated storage degradation test run at 40° C. To 100 parts of a 50% aqueous solution of polyethylenimine having an average molecular weight of about 5000 was added 2.0 parts of the test chelant. After thorough mixing, the solution (in a capped bottle) was placed in a water bath held at 40° C. Visual observations were made periodically. The final test observations after 12 days are given in Table I. The brown precipitate observed in the runs with stabilizer was readily removed by filtration, giving a colorless PEI solution.

TABLE I
[Stabilization of aqueous PEI]

| Run | Stabilizer | Appearance after 12 days |
|---|---|---|
| 1-1 | None | Dark amber color throughout solution. |
| 1-2 | Sodium N-hydroxyethyl iminodiacetate. | Colorless liquid with small amount of dark brown precipitate. |
| 1-3 | Sodium N,N-dihydroxyethylglycinate. | Same as 1-2. |
| 1-4 | Sodium ethylenediaminetetraacetate. | Do. |

EXAMPLE 2

Stabilization of PEI drainage aid solution

About 330 gallons of an aqueous PEI solution useful as a drainage aid in the formation of paper sheets from the pulp slurry was prepared containing about 22.3% PEI (MW—100,000), 4% HCl, 1% NaHSO$_3$ and 72.7% water. It was divided into 6 portions and stored in sealed drums at about 32° C. for a week, one drum was then opened and 19.4 parts of a 48.6% solution of sodium ethylenediaminetetraacetate added to the 467 parts of the PEI solution, e.g. about 9.0% Na$_4$ EDTA based on PEI with thorough mixing. Then the drum was resealed.

After 8 weeks storage the stabilized PEI solution showed no detectable change in color or viscosity and there was no surface scum. In contrast the unstabilized product contained large gel particles and a considerable surface layer of red-brown scum. Clearly the aminocarboxylate chelant was effective in preventing degradation and discoloration. In a similar test, hydroxycarboxylate chelants such as citric acid were ineffective.

EXAMPLE 3

Stabilization of metal contaminated PEI

Not only do the amino carboxylate chelants function to prevent degradation and formation of colored impurities, but also they will reduce color caused by trace quantities of transition and heavy metal ions, particularly iron.

To several 400 part samples of 50% aqueous PEI badly discolored by iron contamination was added 0.1–1.0 part of sodium ethylenediaminetetraacetate as 48.6% aqueous solution. Visual color ratings, after 2 days at 40° C., are given in Table II using a rating of 1 for essentially colorless and 5 for highly colored.

TABLE II
[Stabilization of Fe Contaminated PEI]

| Run | Parts Na$_4$EDTA | Initial | 40° C., 2 days |
|---|---|---|---|
| 3-1 | None | 5 | 5 |
| 3-2 | 0.1 | 5 | 2 |
| 3-3 | 0.5 | 5 | 2 |
| 3-4 | 1.0 | 5 | 2 |

EXAMPLE 4

Stabilization of PAPA-PEI

To test the effectiveness of the aminocarboxylate chelants in stabilizing other polyamines and polyamine mixtures, a standard mixture was prepared by adding 101.2 parts of 37% aqueous PAPA (MW 20–30,000) to 75 parts of 50% aqueous PEI (MW 5,000) then partially neutralized with tech. grade hydrochloric acid (35%). Test samples were placed in bottles and from 0.65 to 19.2% based on polyamine, of sodium ethylenediaminetetraacetate added. The bottles were sealed, placed in the 50° C. water bath and visually observed for several days. Typical results are summarized in Table III.

TABLE III
[Stabilization of PAPA-PEI]

| | PAPA | PEI | Na$_4$EDTA | Conc. HCl | Water |
|---|---|---|---|---|---|
| 1 | 101.2 | 75 | None | 50 | 73.7 |
| 2 | 101.2 | 75 | 1.0 | 50 | 72.7 |
| 3 | 101.2 | 75 | 15.0 | 50 | 58.7 |
| 4 | 101.2 | 75 | 30.0 | 50 | 43.7 |

NOTE.—No. 1 is a blank or control.
OBSERVATION.—After 2 weeks of accelerated ageing, samples No. 3 and 4 were less colored than the blank.

Use of these amino carboxylate chelants with other polyamines of molecular weight of about 600 to about 1 million gives similar color stabilization.

I claim:

1. As a composition a polyamine selected from the group consisting of polyalkylenepolyamines and polyalkylenimines, stabilized with about 0.05–10.0 weight percent, based on polyamine, of a water-soluble aminocarboxylate chelant of the formula

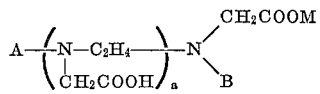

where
A and B individually are —C$_2$H$_4$OH or —CH$_2$COOM groups,
$a$ is 0–2, and
each M is a water-soluble monovalent cation.

2. The composition of claim 1 where the polyamine is a polyalkylenimine having a molecular weight of about 600–1,000,000.

3. The composition of claim 1 where the polyamine is a polyethylenimine having a molecular weight of about 5,000–100,000.

4. The composition of claim 1 where the chelant is a water-soluble salt of ethylenediaminetetraacetic acid.

5. The composition of claim 1 where the chelant is a water-soluble salt of nitrilotriacetic acid.

6. The composition of claim 1 where the chelant is sodium hydroxyethylaminodiacetate.

7. The composition of claim 1 where the chelant is sodium N,N-dihydroxyethylglycinate.

8. The composition of claim 1 where an aqueous polyethylenimine is stabilized with sodium ethylenediaminetetraacetate.

9. An aqueous solution of the composition of claim 1 containing about 5–50 weight percent of the polyamine.

References Cited

UNITED STATES PATENTS

| 2,242,484 | 5/1941 | Schroy | 260—33.4 |
| 2,667,522 | 1/1954 | McElroy | 260—814 |
| 3,335,108 | 8/1967 | Pines | 260—45.8 |
| 3,346,527 | 10/1967 | Lagally | 260—29.2 |

DONALD E. CZAJA, Primary Examiner

V. P. HOKE, Assistant Examiner

U.S. Cl. X.R.

260—2, 29.2, 45.75, 239, 566, 583